US010532408B2

(12) United States Patent
Giberman

(10) Patent No.: US 10,532,408 B2
(45) Date of Patent: Jan. 14, 2020

(54) PIPE END MACHINING DEVICE

(71) Applicant: Illinois Tool Works Inc., Glenview, IL (US)

(72) Inventor: Alexander S. Giberman, Northbrook, IL (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 0 days.

(21) Appl. No.: 16/183,285

(22) Filed: Nov. 7, 2018

(65) Prior Publication Data

US 2019/0070667 A1 Mar. 7, 2019

Related U.S. Application Data

(62) Division of application No. 15/185,428, filed on Jun. 17, 2016, now Pat. No. 10,376,963.

(60) Provisional application No. 62/190,315, filed on Jul. 9, 2015.

(51) Int. Cl.
*B23B 5/16* (2006.01)

(52) U.S. Cl.
CPC ............. *B23B 5/161* (2013.01); *B23B 5/162* (2013.01); *B23B 2215/72* (2013.01); *B23B 2220/04* (2013.01)

(58) Field of Classification Search
CPC . B23B 2215/72; B23B 2220/04; B23B 5/161; B23B 5/162; B23B 3/265; B23B 3/26
See application file for complete search history.

(56) References Cited

U.S. PATENT DOCUMENTS

| 4,114,484 A | 9/1978 | Feamster, III |
| 4,437,366 A | 3/1984 | Astle |
| 4,950,109 A | 8/1990 | Dettinger |
| 5,069,094 A | 12/1991 | Birkestrand |
| 5,605,084 A | 2/1997 | Pierce |
| 5,623,858 A | 4/1997 | Birkestrand |

(Continued)

FOREIGN PATENT DOCUMENTS

| CN | 2034485 U | 3/1989 |
| CN | 2573120 Y | 9/2003 |
| WO | 2011066005 A2 | 6/2011 |

OTHER PUBLICATIONS

International Search Report and Written Opinion from corresponding International Application No. PCT/US2016/040505 dated Oct. 28, 2016, 10 pages.

(Continued)

*Primary Examiner* — Sara Addisu
(74) *Attorney, Agent, or Firm* — Klintworth & Rozenblat IP LLP

(57) ABSTRACT

A pipe end machining device configured to machine an end of a pipe includes an outer housing, a spindle rotatably mounted within the outer housing and configured to carry tool supports and cutting tools, a mounting assembly configured to be attached to the pipe, a stem extending from the mounting assembly and connected to the spindle by an interengagement which allows the spindle to move linearly relative to the stem, but prevents rotational movement of the spindle relative to the stem, and a locking assembly attached to the stem and configured to fix the vertical position of the outer housing and the spindle relative to the mounting assembly.

14 Claims, 15 Drawing Sheets

(56) References Cited

U.S. PATENT DOCUMENTS

| | | | |
|---|---|---|---|
| 5,954,462 | A | 9/1999 | Way et al. |
| 8,925,431 | B2 * | 1/2015 | Manwaring ............. B23B 5/162 82/113 |
| 9,623,485 | B2 * | 4/2017 | DHooge ................. B23B 5/163 |
| 10,035,194 | B2 | 7/2018 | Hunnekuhl et al. |
| 2001/0029817 | A1 | 10/2001 | Strait |
| 2002/0078803 | A1 | 6/2002 | Weber |
| 2005/0015965 | A1 | 1/2005 | Maier et al. |
| 2010/0129170 | A1 | 5/2010 | Wilmot |
| 2011/0041658 | A1 | 2/2011 | Weinberg et al. |
| 2011/0083537 | A1 | 4/2011 | Place et al. |
| 2011/0232434 | A1 | 9/2011 | Bortoli |
| 2012/0067180 | A1 | 3/2012 | Lier |
| 2012/0273002 | A1 | 11/2012 | Myers et al. |
| 2015/0040731 | A1 | 2/2015 | Moherman et al. |
| 2015/0086287 | A1 | 3/2015 | Connolly et al. |
| 2015/0174662 | A1 | 6/2015 | Zabel et al. |
| 2015/0290757 | A1 | 10/2015 | Rieth |
| 2016/0001376 | A1 | 1/2016 | Maurer et al. |
| 2016/0236284 | A1 | 8/2016 | Kurth et al. |
| 2016/0375509 | A1 | 12/2016 | Pierce et al. |
| 2017/0252831 | A1 | 9/2017 | Hunnekuhl et al. |
| 2018/0036851 | A1 | 2/2018 | Rattunde |

OTHER PUBLICATIONS

International Preliminary Report on Patentability with Written Opinion of the International Searching Authority dated Jan. 18, 2018 from corresponding International Patent Application No. PCT/US2016/04505, 7 pages.

* cited by examiner

PIPE END MACHINING DEVICE

This application is a divisional application of U.S. patent application Ser. No. 15/185,428, filed on Jun. 17, 2016, and claims the domestic priority of U.S. Provisional Application Ser. No. 62/190,315, filed on Jul. 9, 2015, the contents of which are incorporated herein in its entirety.

FIELD OF THE DISCLOSURE

The present disclosure generally relates to a pipe end machine device configured to form a planar cut or a bevel cut on a hollow member, such as a pipe.

BACKGROUND

Extended piping requires that shorter lengths of pipe be welded together end to end to form a longer section and prior to joining two lengths together. The mated ends must be machined to receive a weld. Machines that bevel the end of a length of pipe engage the inner surface of the pipe and retain the machine rigid with respect to the pipe. The machine includes a rotating member with a cutting end. Some machines can be configured to automatically cut a bevel at a fixed angle, for example, cut at ten degrees. Other machines move the tool radially at a fixed rate and provide a manually operable feed screw for moving the tool axially.

SUMMARY

In one aspect, a pipe end machining device configured to machine an end of a pipe is provided. The pipe end machining device includes an outer housing, a spindle rotatably mounted within the outer housing and configured to carry tool supports and cutting tools, a mounting assembly configured to be attached to the pipe, a stem extending from the mounting assembly and connected to the spindle by an interengagement which allows the spindle to move linearly relative to the stem, but prevents rotational movement of the spindle relative to the stem, and a locking assembly attached to the stem and configured to fix the vertical position of the outer housing and the spindle relative to the mounting assembly.

The scope of the present disclosure is defined solely by the appended claims and is not affected by the statements within this summary.

DETAILED DESCRIPTION

Figure 1:
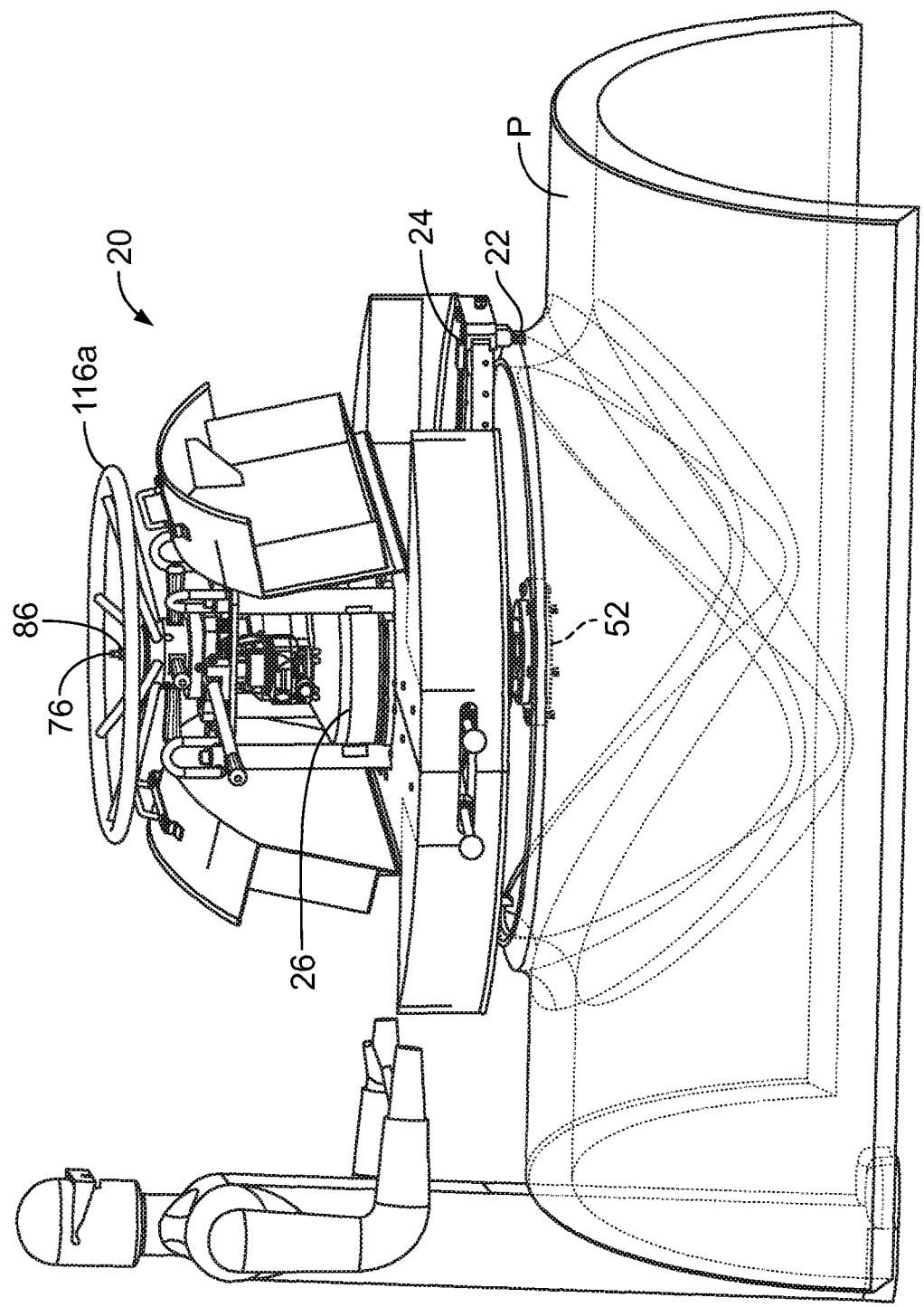
FIG. 1 is a perspective view of a pipe end machining device mounted on a pipe according to present disclosure.
Figure 2:
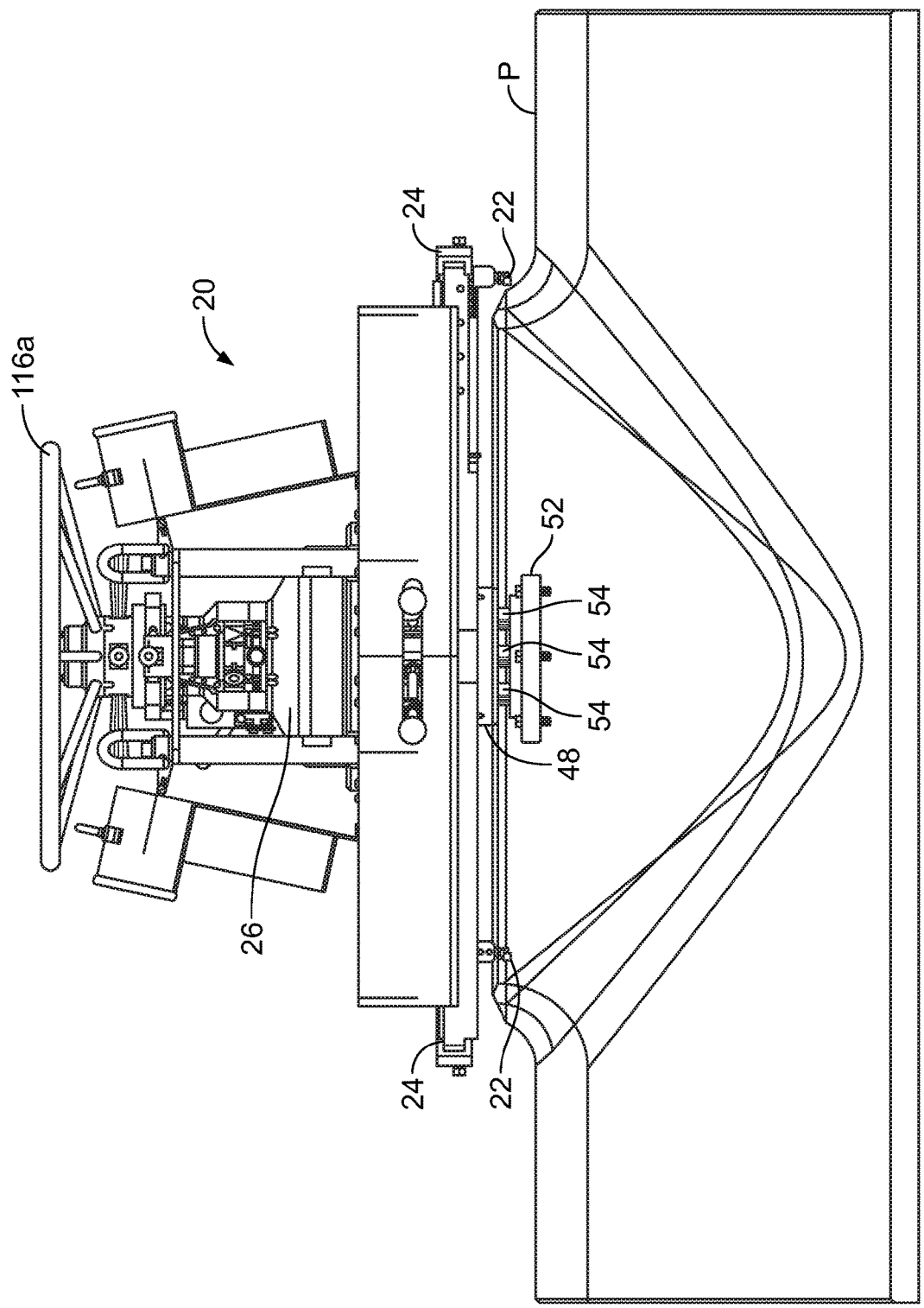
FIG. 2 is a side elevation view of the pipe end machining device mounted on the pipe.
Figure 3:
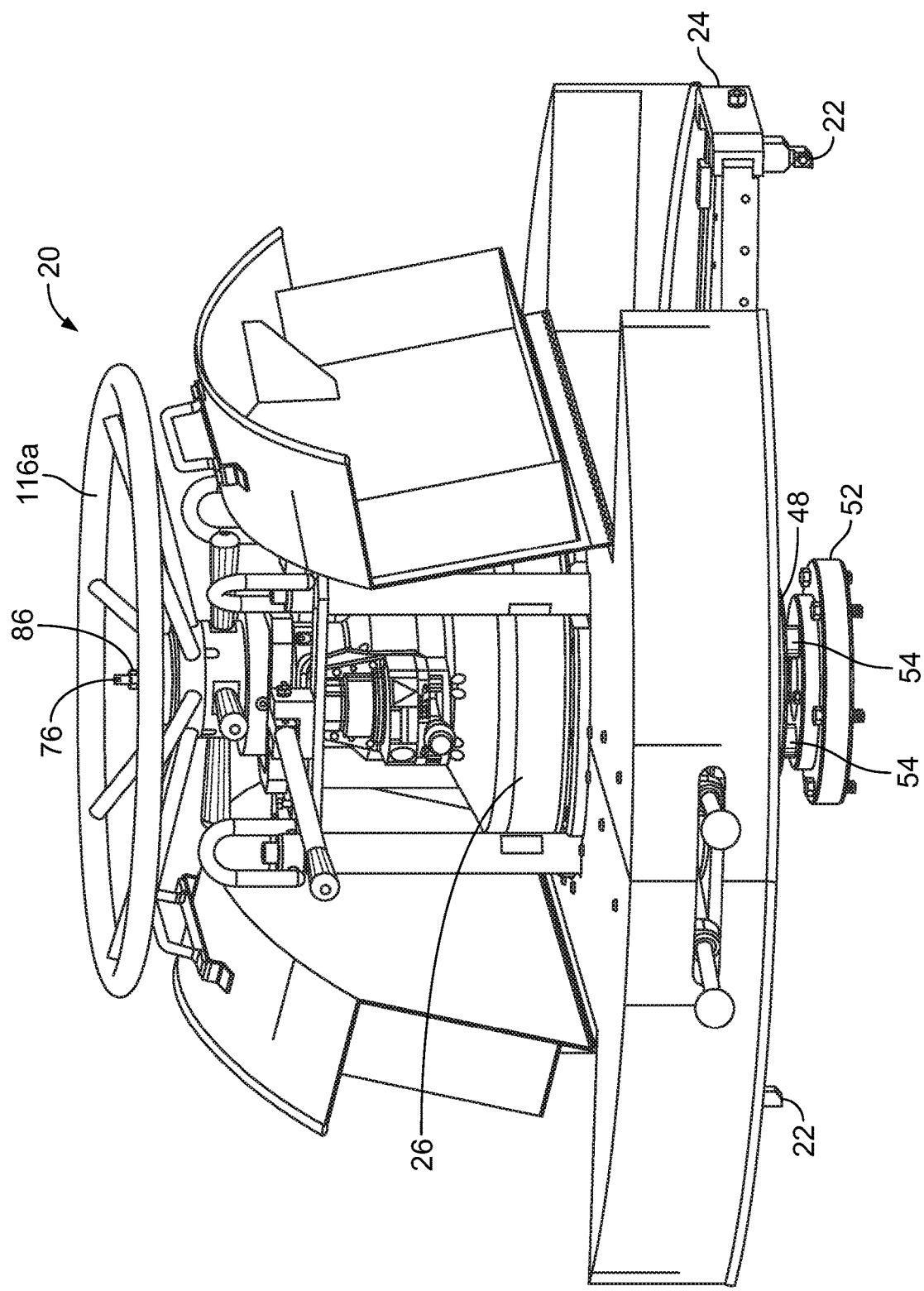
FIG. 3 is a perspective view of the pipe end machining device.

Referring to FIGS. 1 and 2, a pipe end machining device 20 configured to machine an end of a pipe P is provided. The pipe end machining device 20 can be used to cut a planar surface on the end of the pipe P using cutting tools 22 mounted on tool carriers 24, or can be used to cut a beveled surface of the end of the pipe P. If a planar surface is being cut, the pipe end machining device 20 is held vertically stationary relative to the pipe P, while the cutting tools 22 are moved radially relative to the pipe P. If a beveled surface is being cut, portions of the pipe end machining device 20 are moved vertically relative to the pipe P, while the cutting tools 22 are moved radially relative to the pipe P. While the terms upper, upward, lower, downward, vertical and the like are used herein, these terms are used for ease in describing the pipe end machining device 20 and do not denote a required orientation for use.

Figure 4:
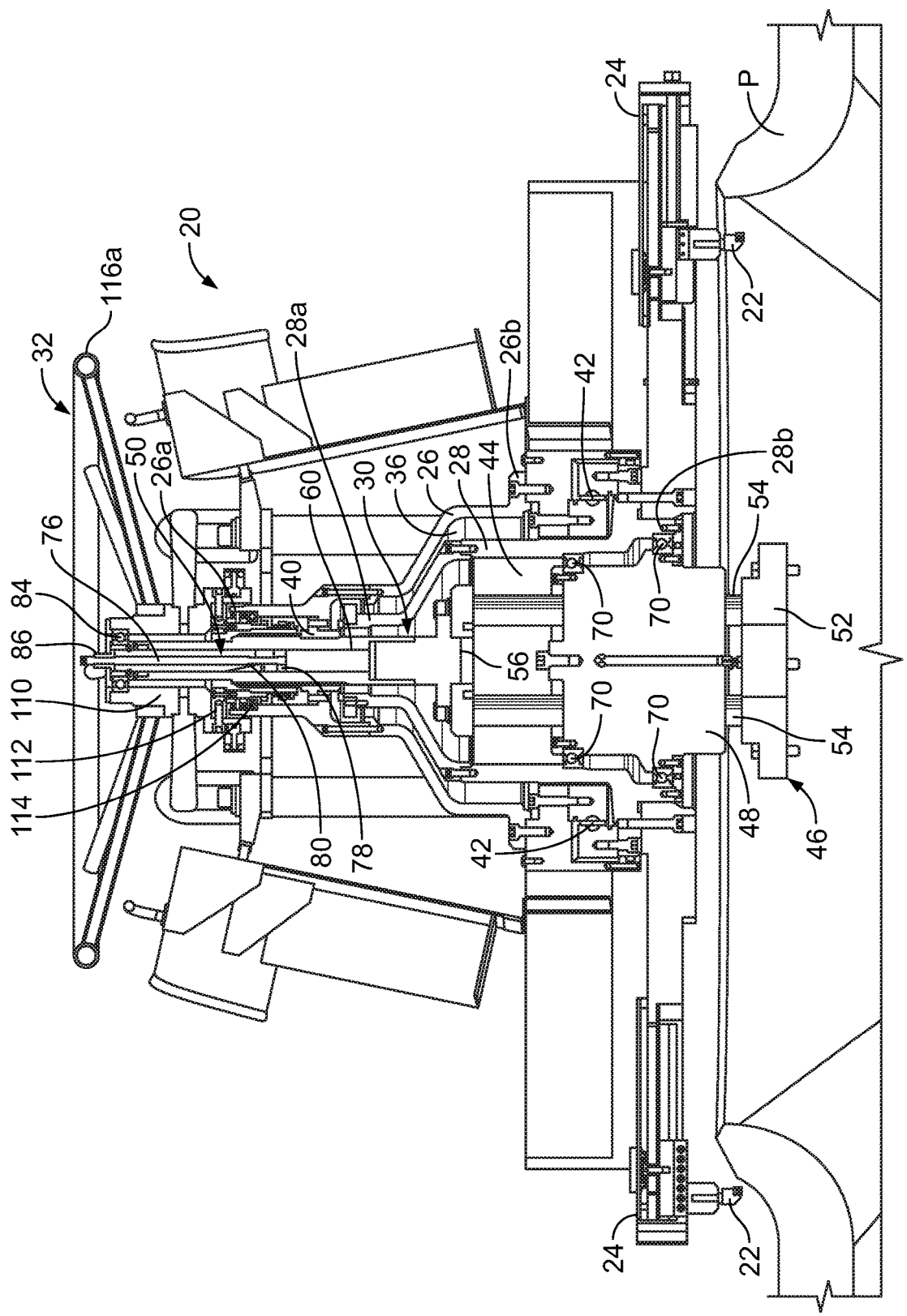
FIG. 4 is a cross-sectional view of the pipe end machining device in a first position.
Figure 8:
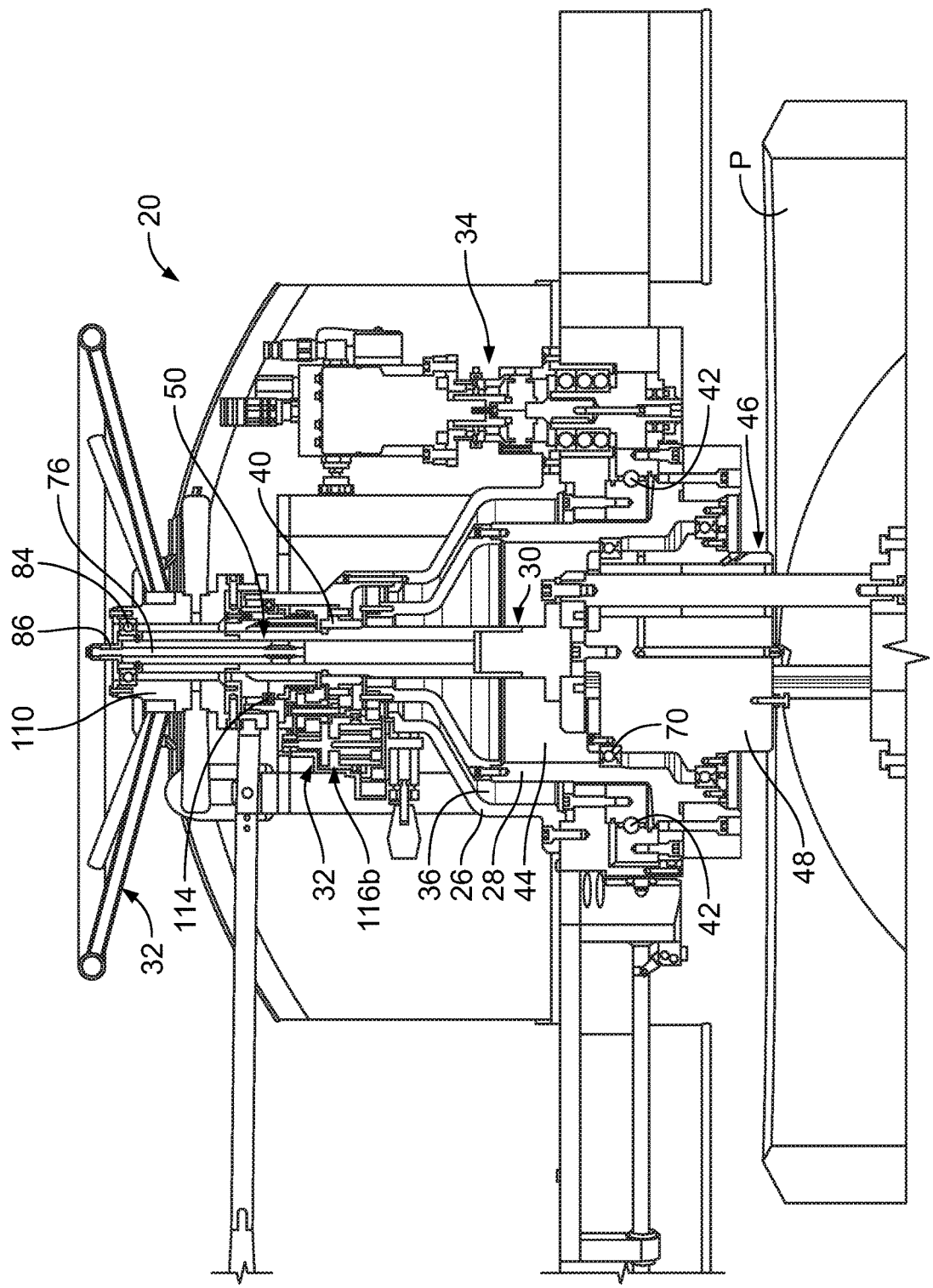
FIG. 8 is an alternate cross-sectional view of the pipe end machining device in the second position.
Figure 9:
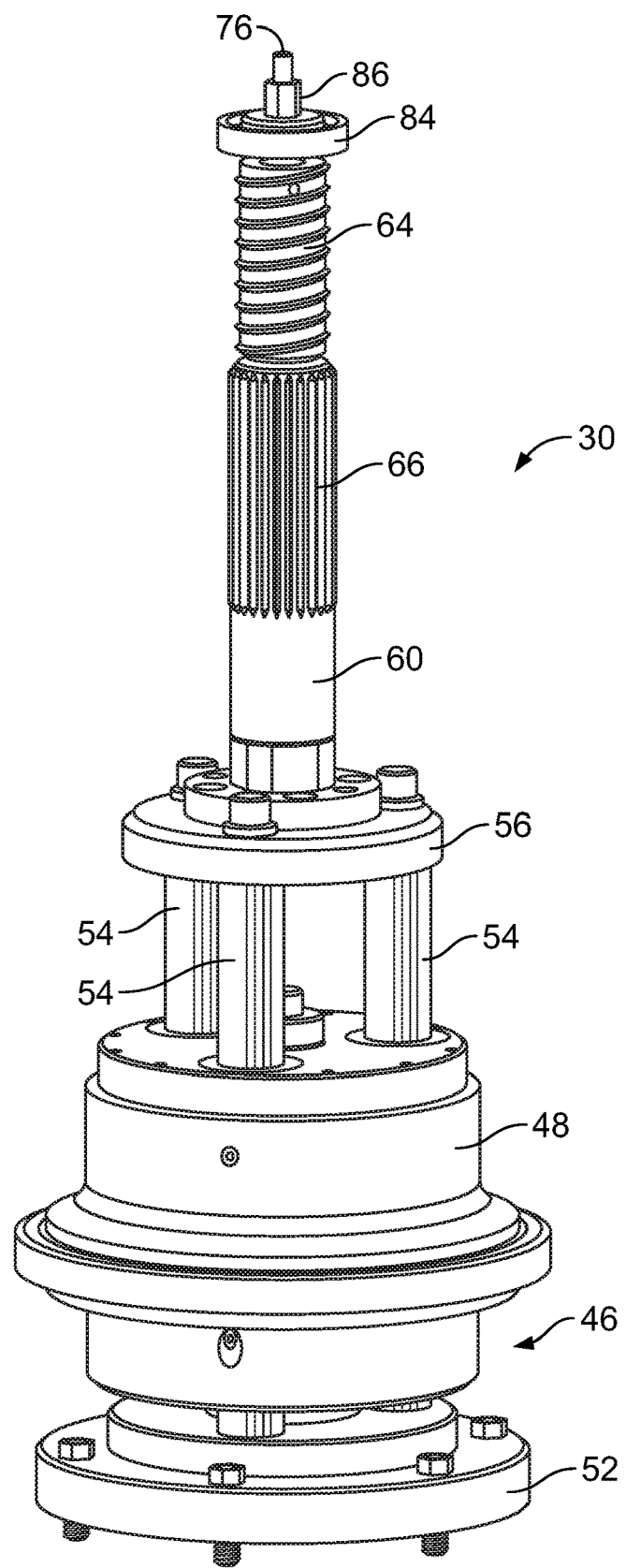
FIG. 9 is a perspective view of a hub assembly which forms part of the pipe end machining device.
Figure 10:
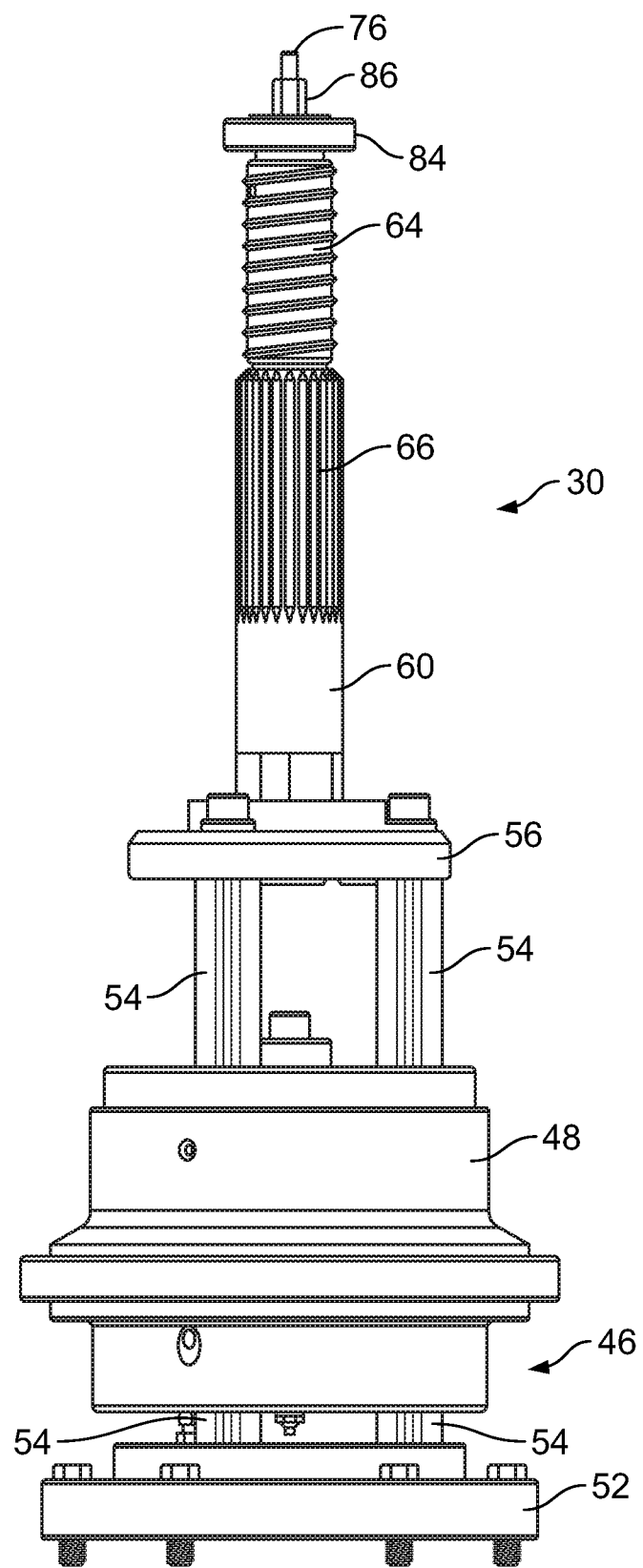
FIG. 10 is a side elevation view of the hub assembly.

With reference to FIG. 4, the pipe end machining device 20 includes an outer housing 26 having a spindle 28 rotatably mounted therein, the tool carriers 24 are mounted on the spindle 28, a hub assembly 30 attached to the outer housing 26, a vertical adjustment assembly 32 attached to the hub assembly 30 and to the outer housing 26, and a drive assembly 34, see FIG. 8, used to rotate the spindle 28 and tool carriers 24. The vertical adjustment assembly 32 is used to adjust the upward and downward position of the cutting tools 22 relative to the pipe P. The hub assembly 30 is used to mount the pipe end machining device 20 to a fixture (not shown) mounted on the pipe P and to fix the relative upward or downward position of the cutting tools 22 relative to the pipe P, thereby preventing vibration and chatter when the pipe end machining device 20 is cutting a planar surface on the end of the pipe P.

Figure 5:
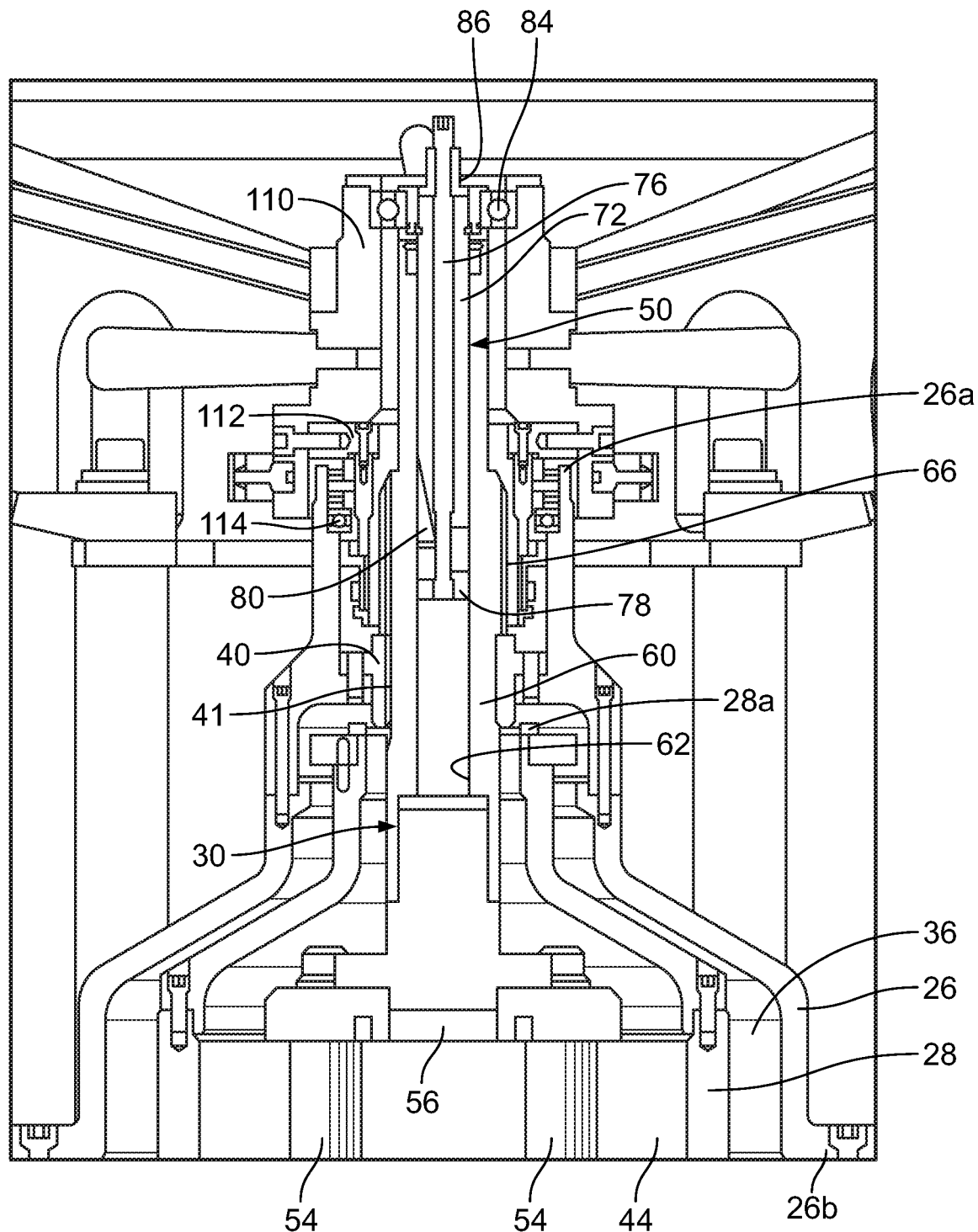
FIG. 5 is an enlarged partial cross-sectional view of the pipe end machining device in the first position.

As best shown in FIG. 5, the outer housing 26 has an upper end 26a, a lower end 26b and a cavity 36 formed therein. The upper and lower ends 26a, 26b are open such that passageways are defined therethrough. The outer housing 26 has a collar 40 extending inwardly into the cavity 36. The collar 40 has a passageway formed therethrough. A plurality of splines 41 are formed on the wall forming the passageway in the collar 40.

The spindle 28 is mounted within the cavity 36 of the outer housing 26. The spindle 28 has an upper end 28a, a lower end 28b (see FIG. 4) and a cavity 44 formed therein. The upper and lower ends 28a, 28b are open such that passageways are defined therethrough.

The tool carriers 24 are mounted to the lower end 28b of the spindle 28 and extend outwardly therefrom and outwardly from the outer housing 26. The spindle 28 and the tool carriers 24 are rotatable relative to the outer housing 26 via bearings 42 (which form part of the drive assembly 34) mounted between the spindle 28 and the outer housing 26.

The spindle 28 and tool carriers 24 are driven by drive assembly 34 to rotate relative to outer housing 26. Such a drive assembly 34 may be made in accordance with the description in U.S. provisional application Ser. No. 62/188,148 filed on Jul. 2, 2015, the disclosure of which is incorporated herein by reference in its entirety. Each tool carrier 24 includes cutting tools 22 which are used to cut the end of the pipe P and to form a bevel on the end of the pipe P. The cutting tools 22 on the tool carriers 24 can be moved inwardly and outwardly relative to the spindle 28 to cut the pipe P during operation as is known in the art.

The hub assembly 30 is best shown in FIGS. 9-14. The hub assembly 30 is mounted within the cavity 44 of the spindle 28 and extends through the open upper and lower ends 28a, 28b. The hub assembly 30 and has a first end fixedly connected to the fixture mounted within the pipe P, and a second end connected to an upper end of the outer housing 26. After completion of the cut, the hub assembly 30 is disconnected from the fixture for removal of the pipe end machining device 20 from the pipe P. The hub assembly 30 is rotatable relative to the outer housing 26. The hub assembly 30 can be moved relative to the fixture in order to move the outer housing 26, the spindle 28 and the tool carriers 24 vertically relative to the fixture and to the pipe P to which the fixture is attached. The hub assembly 30 can be locked in position to prevent the vertical movement of the outer housing 26, the spindle 28 and the tool carriers 24 relative to the fixture and to the pipe P. When the hub assembly 30 is locked into position, this aids in minimizing vibration and chatter during operation of the pipe end machine device 20 when a planar cut is being formed on the end of the pipe P.

The hub assembly 30 includes a mounting assembly 46 which is fixedly attached to the fixture and is used to mount the pipe end machining device 20 to the pipe P, a hub 48 mounted on the mounting assembly 46, and a locking assembly 50, see FIGS. 11-14, which is used to fix the vertical position of the outer housing 26, the spindle 28 and the tool carriers 24 relative to the mounting assembly 46 and thus relative to the fixture and the pipe P. The outer housing 26, the spindle 28 and the tool carriers 24 can be rotated relative to the hub assembly 30 whether the hub assembly 30 is a locked condition or in an unlocked condition.

The mounting assembly 46 includes a lower plate or flange 52, a plurality of splined shafts 54 fixedly mounted between the lower flange 52 and an upper plate 56, and an elongated stem 60 extending upwardly from the upper plate 56 and affixed to the upper plate 56. The lower plate or flange 52 is connected to the fixture and the mounting assembly 46 is stationary relative to the fixture and the pipe P during use.

The stem 60 has an elongated passageway 62 which extends from an open upper end 60a of the stem 60 downwardly. The passageway 62 may extend through the stem 60. The passageway 62 may be cylindrical. The exterior surface of the stem 60 has an upper portion which has a spiral feed screw thread form 64 thereon and an intermediate portion which has series of vertical splines 66.

The splines 41, see FIG. 5, on the collar 40 of the outer housing 26 mate with the splines 66 on the stem 60. This mating allows vertical movement of the outer housing 26 relative to the hub assembly 30 and thus the pipe P, but prevents the rotation of the outer housing 26 relative to the hub assembly 30 and the pipe P.

Figure 6:
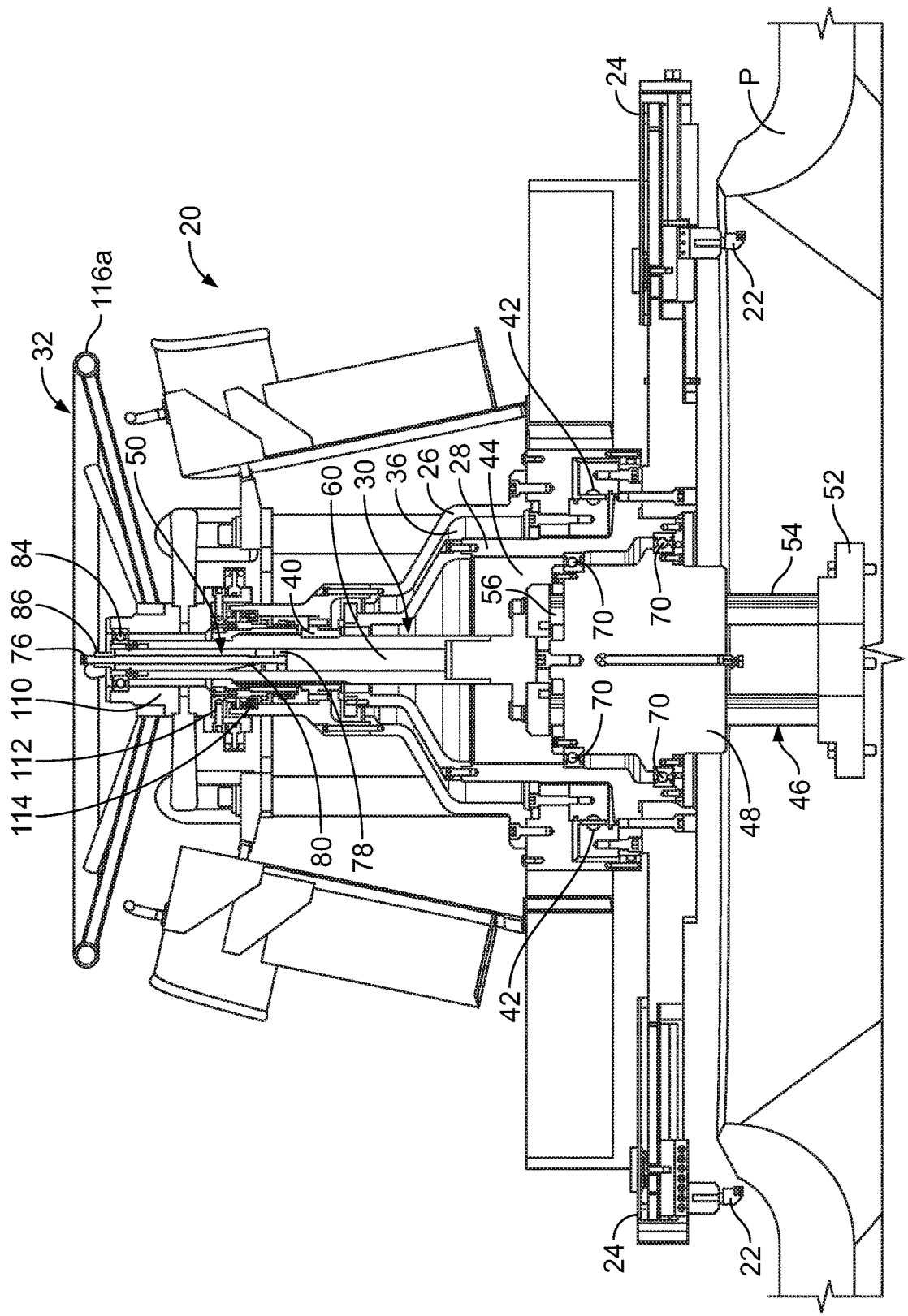
FIG. 6 is a cross-sectional view of the pipe end machining device in a second position.
Figure 7:
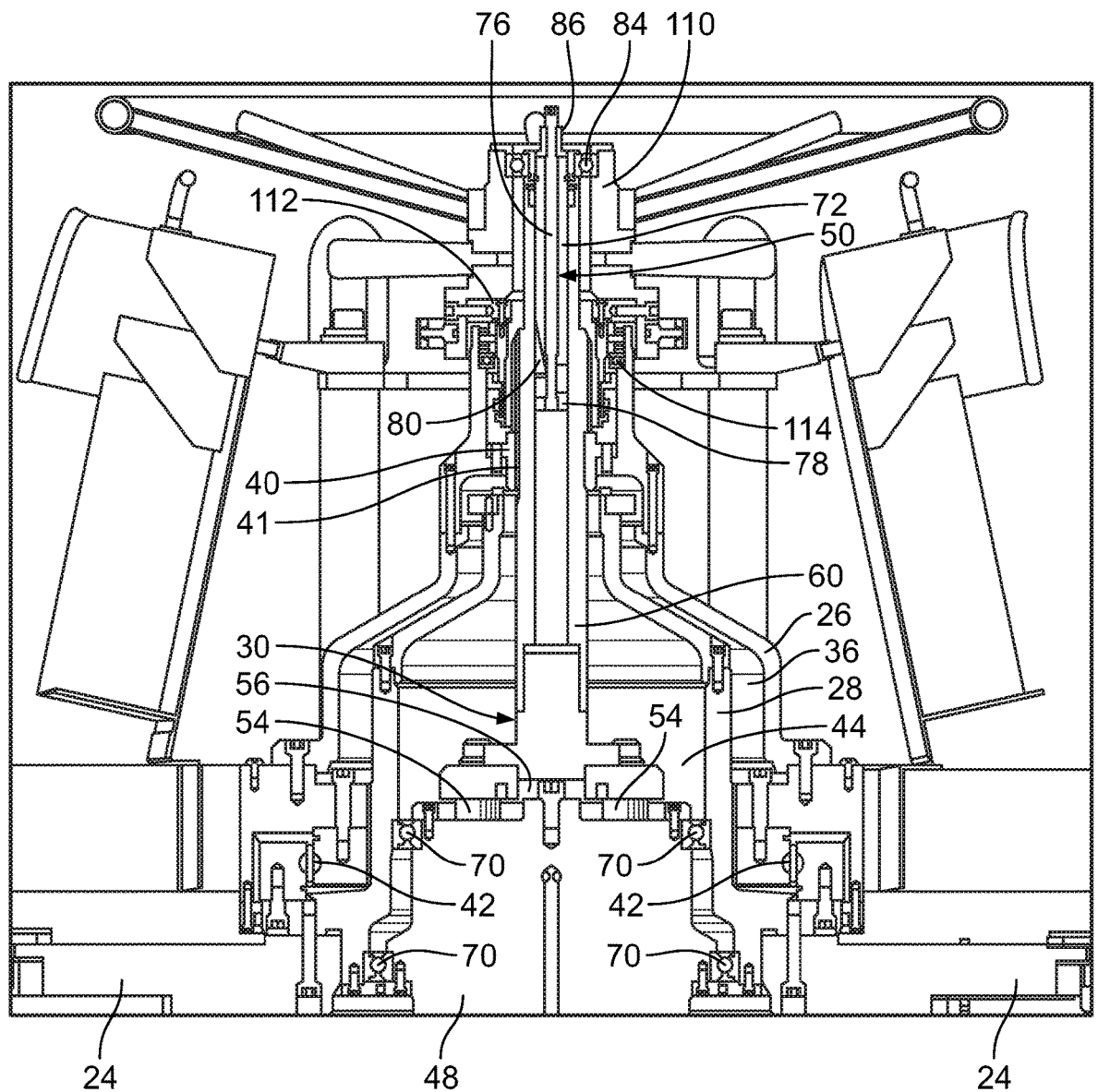
FIG. 7 is an enlarged partial cross-sectional view of the pipe end machining device in the second position.
Figure 11:
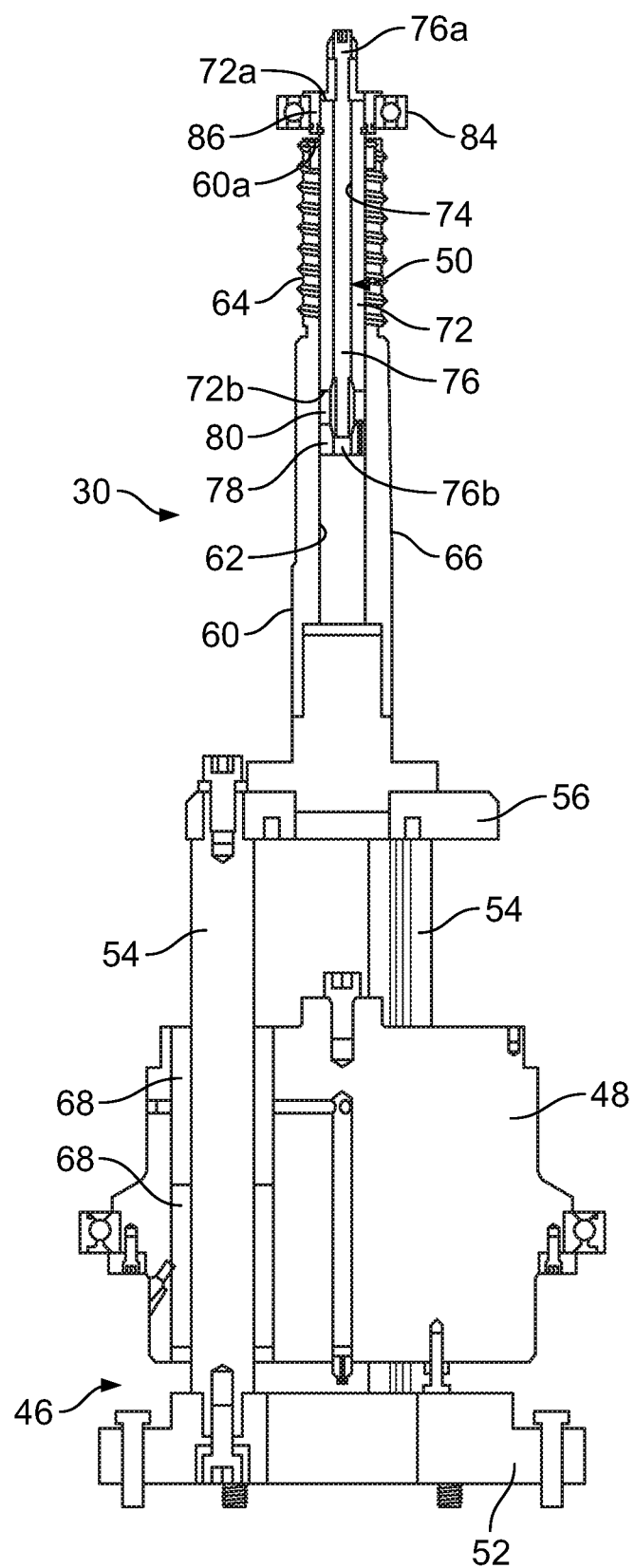
FIG. 11 is a cross-sectional view of the hub assembly.

The hub 48 is mounted on each splined shaft 54 by bushings 68, see FIG. 11, such that the shafts 54 extend through the hub 48, and the hub 48 is capable of vertical movement along the splined shafts 54. As shown, three splined shafts 54 are provided. The centerlines of the splined shafts 54 fall along an imaginary circle formed on the flange 52 and on the upper plate 56. This provides a rigid and stable platform for the hub 48. The hub 48 is connected to the spindle 28 by a plurality of bearings 70, see FIG. 4, such that the spindle 28 is rotatable relative to the hub 48, but moves vertically with the hub 48. FIG. 4 shows the hub 48, spindle 28 and tool carriers 24 in a first position, and FIG. 6 shows the hub 48, spindle 28 and tool carriers 24 in a second position.

As shown in FIGS. 11-14, the locking assembly 50 includes an elongated mandrel 72 having an upper end 72a, a lower end 72b, an outer surface 72c and a passageway 74 extending therethrough, an elongated feed shaft 76 extending through the passageway 74 of the mandrel 72, the shaft 76 having an upper threaded end 76a and a lower end 76b, an end cap 78 attached to the lower end 76b of the shaft 76 and forming an enlarged end of the shaft 76, a plurality of chuck legs 80 having an upper end 80a seated within grooves 88 on the mandrel 72 and a lower end 80b seated on the end cap 78, a bearing 84 seated on the upper end 72a of the mandrel 72, and a nut 86 threadedly attached to the upper end 76a of the shaft 76, the nut 86 being sandwiched between the mandrel 72 and an inner race of the bearing 84. The nut 86 is affixed to the inner race of the bearing 84.

The mandrel 72 has a plurality of spaced apart grooves 88 on an exterior surface thereof. Each groove 88 has an inner wall 90 which commences at the lower end 72b of the mandrel 72 and extends upwardly therefrom. Each inner wall 90 angles outwardly relative to the centerline of the mandrel 72 from the lower end 72b to an upper end 90a of the inner wall 90. Each groove 88 further has a pair of side walls 92, 94 which extend parallel to the centerline of the mandrel 72. A protrusion 96 extends outwardly from the side wall 92 into each groove 88. The mandrel 72 may be cylindrical.

The end cap 78 has a plurality of spaced apart recesses 98 which hold the lower end of a respective chuck leg 80.

Figure 15:
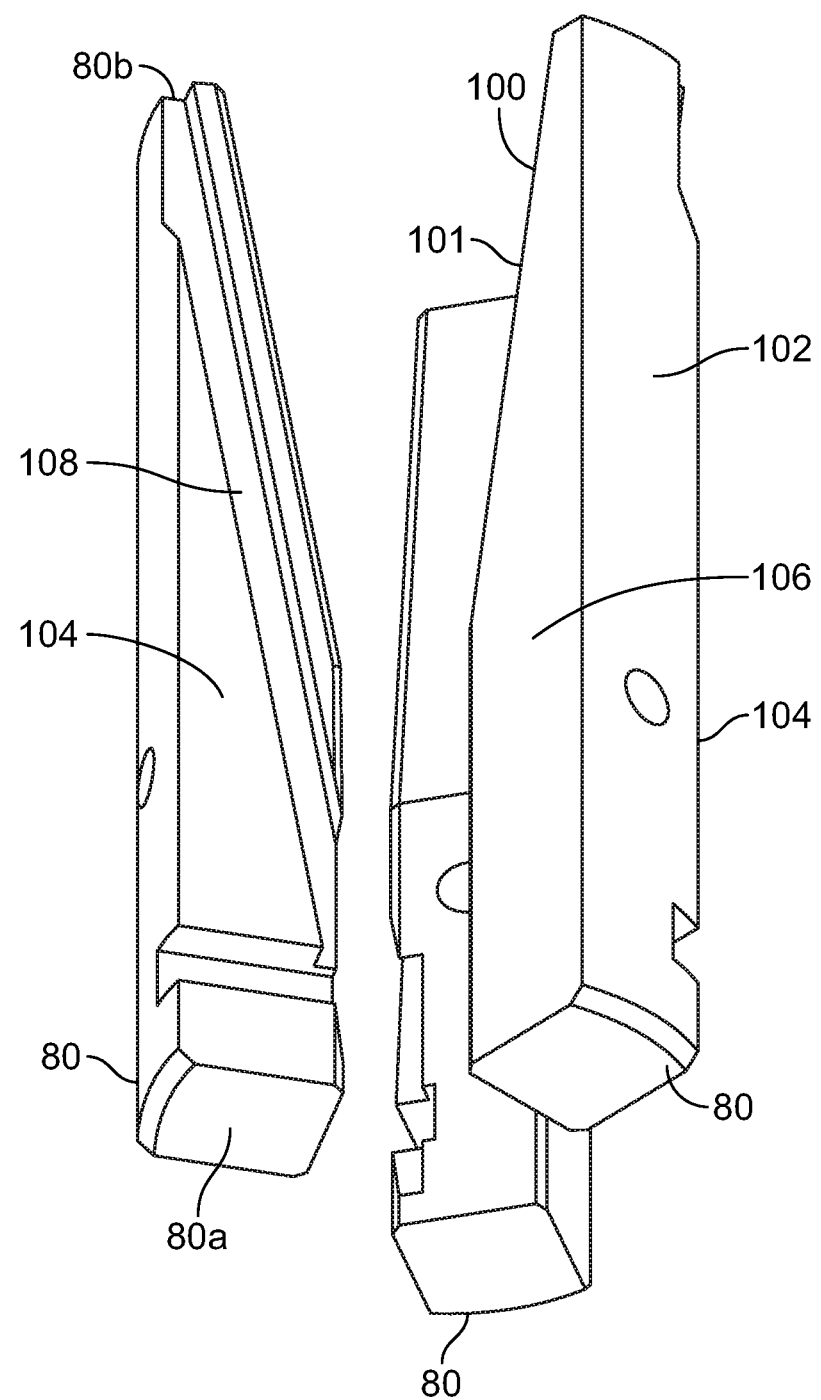
FIG. 15 is a perspective view of the chuck legs of the locking assembly.
Figure 16:
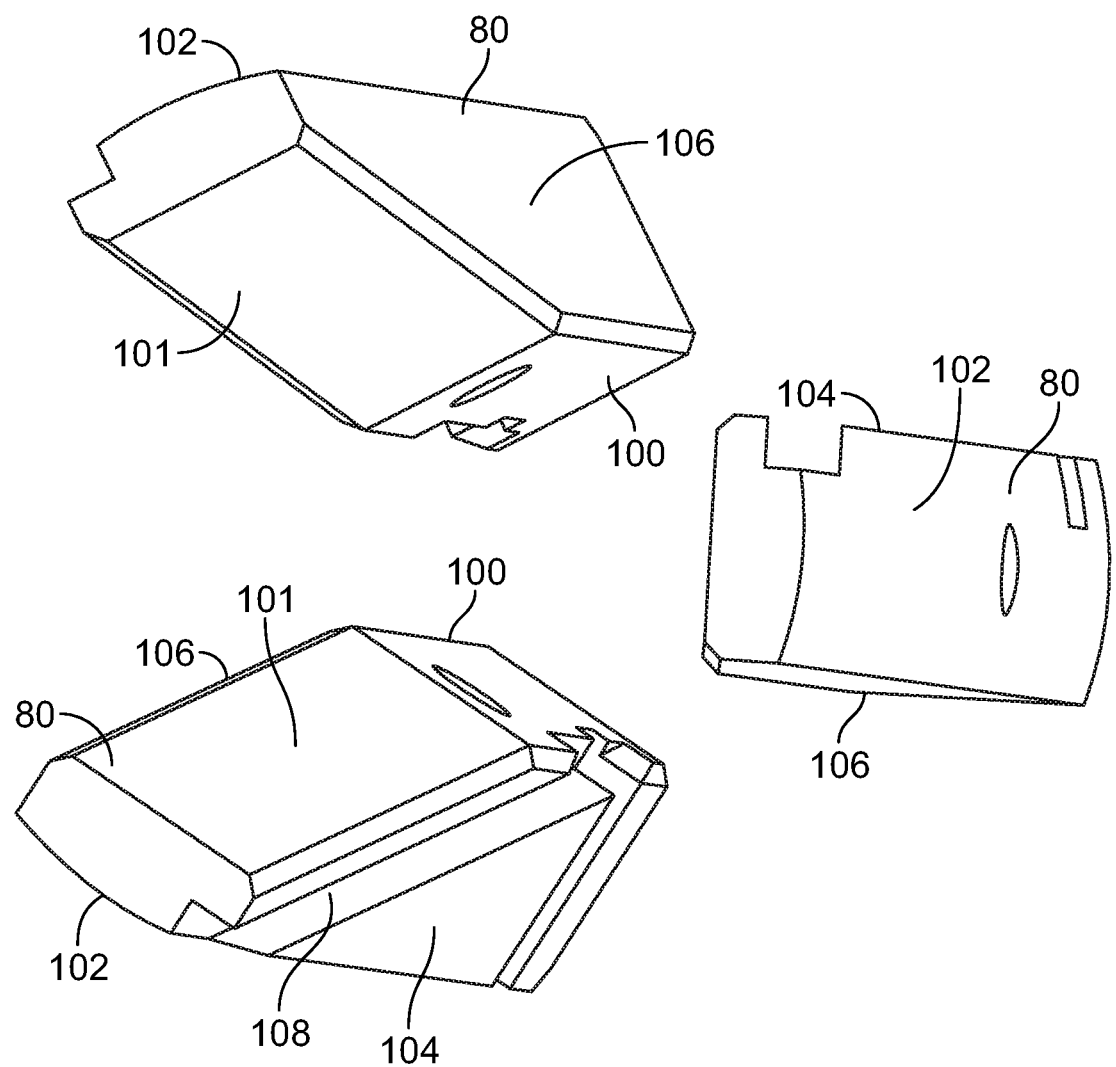
FIG. 16 is an alternate perspective view of the chuck legs of the locking assembly.

As best shown in FIGS. 15 and 16, each chuck leg 80 is wedge-shaped having an inner surface 100, an outer surface 102 and opposing side surfaces 104, 106 extending between the inner and outer surfaces 100, 102. The inner surface 100 of each chuck leg 80 has an angled portion 101 which mirrors the shape of the inner wall 90 and is adapted to slide along the inner wall 90 of the respective groove 88 in which it is mounted. One of the opposing side walls 104 of each chuck leg 80 has a channel 108 which extends along the side wall from an upper end 80a of the chuck leg 80 to a lower end 80b of the chuck leg 80. The outer surface 102 corresponds to the shape of the wall forming the passageway 74 of the mandrel 72. The outer surface 102 has knurling or a coating to roughen the outer surface 102.

Figure 12:
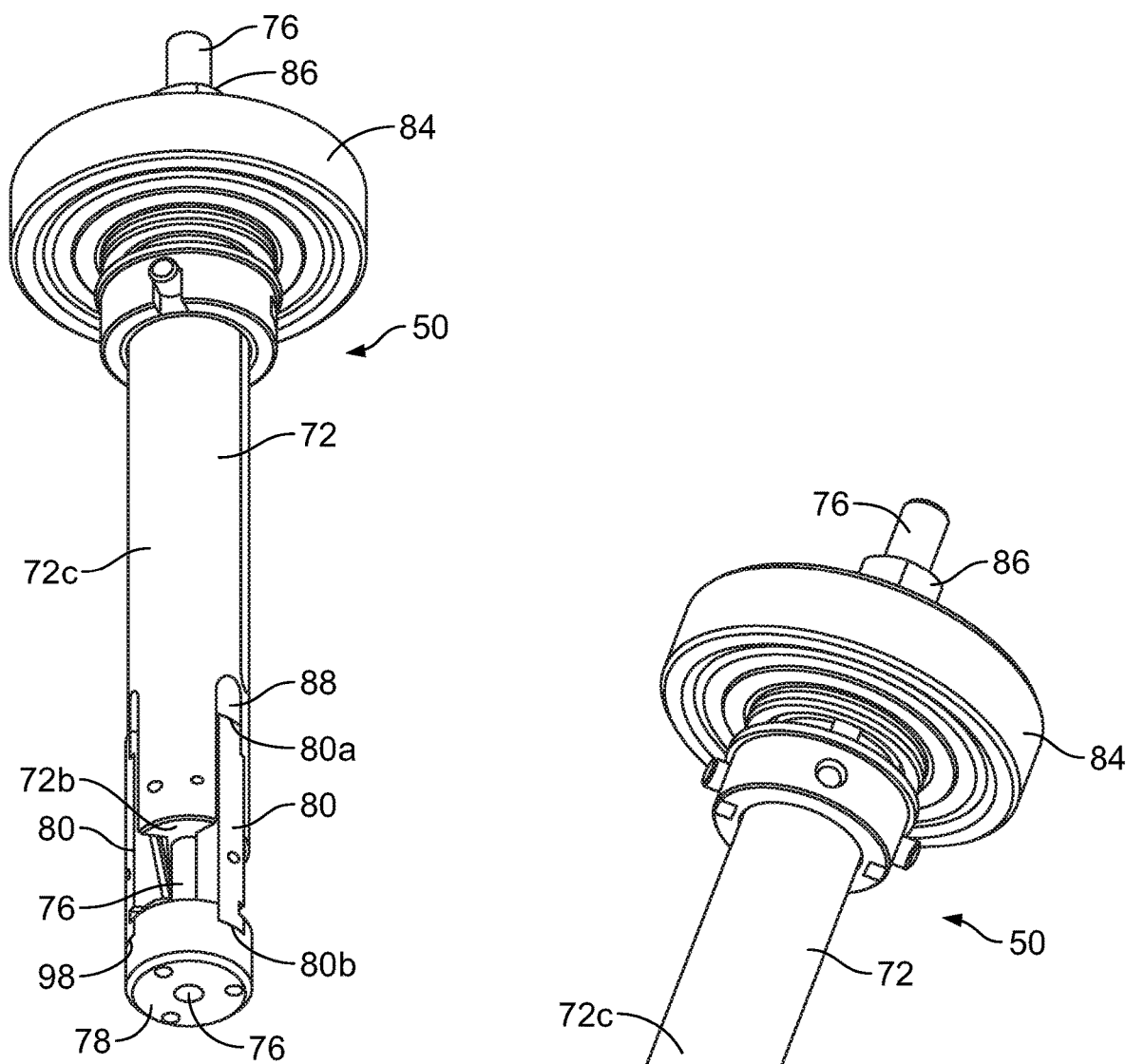
FIG. 12 is a perspective view of a locking assembly which forms part of the pipe end machining device.
Figure 13:
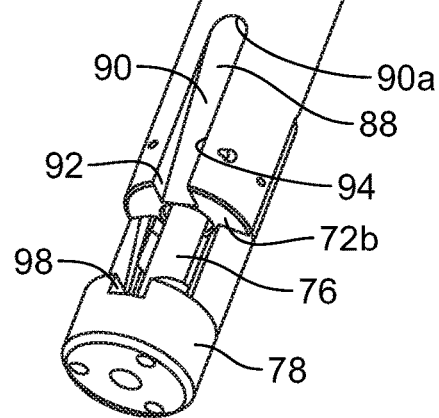
FIG. 13 is an alternative perspective view of the locking assembly.
Figure 14:
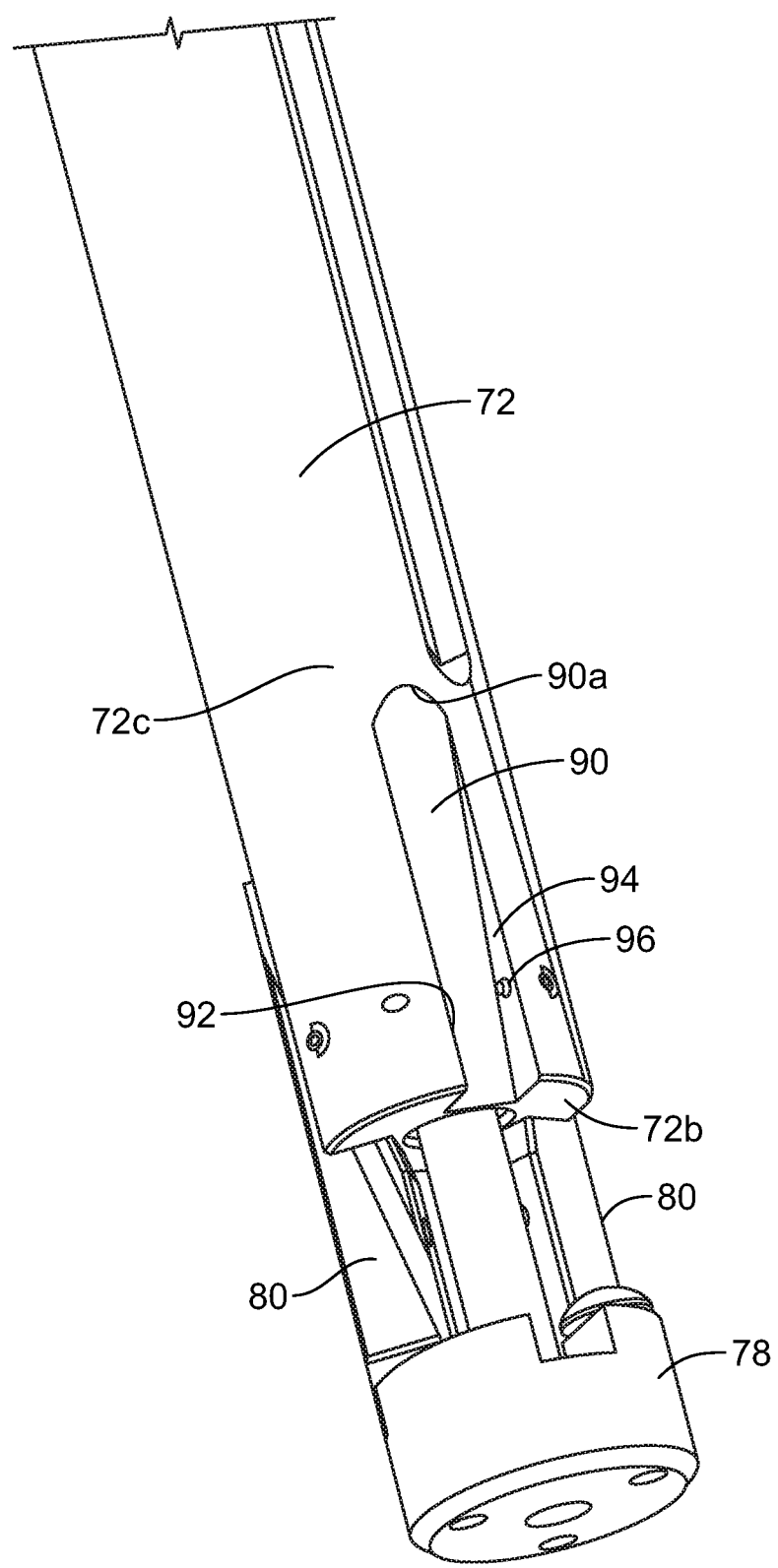
FIG. 14 is a perspective view of a portion of the locking assembly, with a chuck leg of the locking assembly removed.

As shown in FIG. 12, the lower end 80b of each chuck leg 80 seats within the recess 98 in the end cap 78. The protrusions 96 within the grooves 88 engage within the channels 108 in the respective chuck leg 80. The chuck legs 80 can move vertically relative to the mandrel 72 such that that the outer surface 102 is aligned with the outer surface 72c of the mandrel 72, or such that the outer surface 102 is offset from the outer surface 72c of the mandrel 72.

When the nut 86 is rotated, the shaft 76 translates vertically since the nut 86 is vertically stationary relative to the outer housing 26. The locking assembly 50 can be moved to a locked position or to an unlocked position by rotating the nut 86. To move to the locked position, the nut 86 is rotated to move the shaft 76 upwardly, which causes the end cap 78 and chuck legs 80 move upwardly relative to the mandrel 72. The chuck legs 80 slide upwardly along the grooves 88 which causes the chuck legs 80 to move outwardly from the mandrel 72 and toward the stem 60. The protrusions 96 slide along the channels 108. The chuck legs 80 are moved outwardly from the mandrel 72 until the outer surfaces 102 engage the inner wall forming the passageway 62 of the stem 60 to lock the locking assembly 50 into a locked position. This locked position fixes the bearing 84 in place vertically relative to the fixture since the locking assembly 50 is now fixed into position relative to the mounting assembly 46. The coating or knurling on the outer surfaces 102 of the chuck legs 80 aid in preventing the mandrel 72, the shaft 76, the end cap 78 and the chuck legs 80 from sliding relative to the stem 60 when in the locked position. In the unlocked position, the nut 86 is rotated to move the shaft 76 downwardly, which causes the end cap 78 and chuck legs 80 move downwardly relative to the mandrel 72. The chuck legs 80 slide downwardly along the grooves 88 which causes the chuck legs 80 to move inwardly from the stem 60 and toward the mandrel 72. Once the outer surfaces 102 of the chuck legs 80 are no longer engaged with the inner wall forming the passageway 62 of the stem 60, the locking assembly 50 is unlocked. This unlocked position does not fix the bearing 84 in place vertically relative to the fixture since the locking assembly 50 is movable relative to the mounting assembly 46.

As shown in FIGS. 4 and 6, the vertical adjustment assembly 32 includes a cap 110 affixed to the outer race of the bearing 84 of the locking assembly 50, a nut 112 affixed to the cap 110 and engaged with the spiral feed screw thread form 64 on the stem 60, a bearing 114 having an inner race affixed to the nut 112 and an outer race affixed to the upper end 26a of the outer housing 26, and structure 116a, 116b configured to allow rotation of the cap 110.

When the cap 110 is rotated, the outer race of the bearing 84 of the locking assembly 50 rotates around the nut 86 and the shaft 76 of the locking assembly 50, and the affixed nut 112 rotates around the spiral feed screw thread form 64 on the stem 60 causing the nut 112 to translate vertically. The nut 112 rotates relative to the outer housing 26 via bearing 114. Since the outer housing 26 is rotationally fixed to the stem 60 via the engagement between the splines 41, 66, this causes the outer housing 26 to translate vertically, which causes the attached spindle 28 and tool carriers 24 to translate vertically. During this vertical movement, the tool carriers 24 are rotatable relative to the pipe P and the cutting tools 22 can translate radially relative to the tool carriers 24 to bevel the end of the pipe P. In order for this vertical translation to occur, the locking assembly 50 must be in the unlocked position.

If the locking assembly 50 is in the locked position, the pipe end machining device 20 cannot be translated vertically as the vertical position of the bearing 114 is affixed relative to the fixture. The tool carriers 24 are still rotatable relative to the pipe P and the cutting tools 22 can translate radially relative to the tool carriers 24 to plane the end of the pipe P. The locking of the locking assembly 50 aids in minimizing vibration and chatter during the planing operation.

The structure 116a, 116b configured to rotate the cap 110 may include a handle 116a in an embodiment which allows an operator to manually rotate the cap 110, or may include an autodrive 116b in an embodiment as disclosed in U.S. Pat. No. 9,114,458, the disclosure of which is incorporated herein by reference in its entirety.

The Abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While various embodiments of the disclosure have been described, it will be apparent to those of ordinary skill in the art that other embodiments and implementations are possible within the scope of the disclosure. Accordingly, the disclosure is not to be restricted except in light of the attached claims and their equivalents.

The invention claimed is:

1. A pipe end machining device configured to machine an end of a pipe, comprising:
   an outer housing;
   a spindle mounted within the outer housing and configured to carry tool supports and cutting tools, the spindle being rotatable relative to the outer housing;
   a mounting assembly configured to be attached to the pipe;
   a stem extending from the mounting assembly, the stem having a passageway therethrough, the outer housing being rotationally fixed to the stem, wherein the outer housing and the spindle are configured to move linearly relative to the stem; and
   a locking assembly attached to the stem, wherein the locking assembly is configured to fix a vertical position of the outer housing and the spindle relative to the mounting assembly, the locking assembly comprising
      a mandrel mounted within the passageway of the stem, the mandrel having a plurality of grooves therein,
      a feed shaft extending through the mandrel,
      a chuck leg mounted in each groove and attached to the feed shaft, each chuck leg being movable relative to the mandrel and the stem upon movement of the feed shaft, each chuck leg having a surface which mates with the respective groove and a surface which is configured to engage the stem, and
      a rotatable member threadedly connected to the feed shaft and connected to the outer housing, the rotatable member being vertically stationary relative to the outer housing, the feed shaft being rotatable relative to the rotatable member, but moving linearly relative to the rotatable member.

2. The pipe end machining device of claim 1, further comprising a handle attached to the locking assembly, wherein, in use, an operator rotates the handle to activate the locking assembly.

3. The pipe end machining device of claim 1, wherein each groove has an angled wall, and
   each chuck leg has an inclined inner surface which mates with the angled wall of the respective groove.

4. The pipe end machining device of claim 3, further comprising a handle attached to the locking assembly, wherein, in use, an operator rotates the handle to activate the locking assembly.

5. The pipe end machining device of claim 3, wherein three chuck legs are provided.

6. The pipe end machining device of claim 3, wherein each groove further comprises a side wall extending from the angled wall, each side wall having a protrusion extending therefrom, and wherein each chuck leg includes a channel, the respective protrusion being seated within the respective channel.

7. The pipe end machining device of claim 3, wherein each chuck leg is wedge-shaped.

8. The pipe end machining device of claim 7, wherein the locking assembly further comprises a handle attached to the nut, wherein, in use, an operator rotates the handle to rotate the nut.

9. The pipe end machining device of claim 7, wherein each groove comprises an angled wall and a side wall extending from the angled wall, each side wall having a protrusion extending therefrom, and wherein each chuck leg includes a channel, the respective protrusion being seated within the respective channel.

10. The pipe end machining device of claim 1, wherein the feed shaft has an enlarged end with which each chuck leg is engaged.

11. The pipe end machining device of claim 1, further comprising a bearing connected to the outer housing and the rotatable member, the rotatable member being affixed to an inner race of the bearing.

12. The pipe end machining device of claim 11, wherein the rotatable member is a nut.

13. The pipe end machining device of claim 1, wherein the rotatable member is a nut.

14. The pipe end machining device of claim 1, wherein the outer housing and the stem are further connected together by a splined connection.

\* \* \* \* \*